Feb. 23, 1965 G. R. DRENGLER ETAL 3,170,820
METHOD OF MAKING DUPLEX ELECTRODES FOR
HIGH RATE PRIMARY BATTERIES
Filed March 19, 1963 2 Sheets-Sheet 1
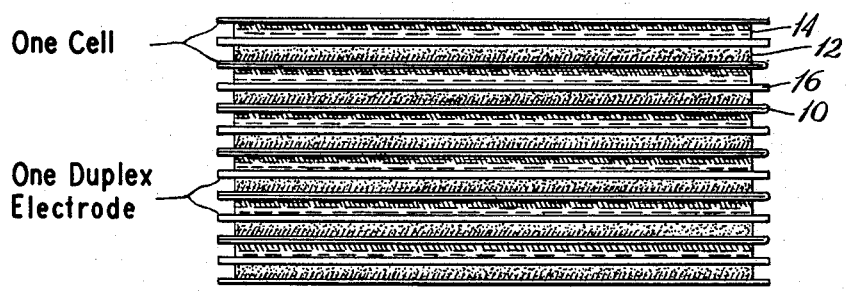
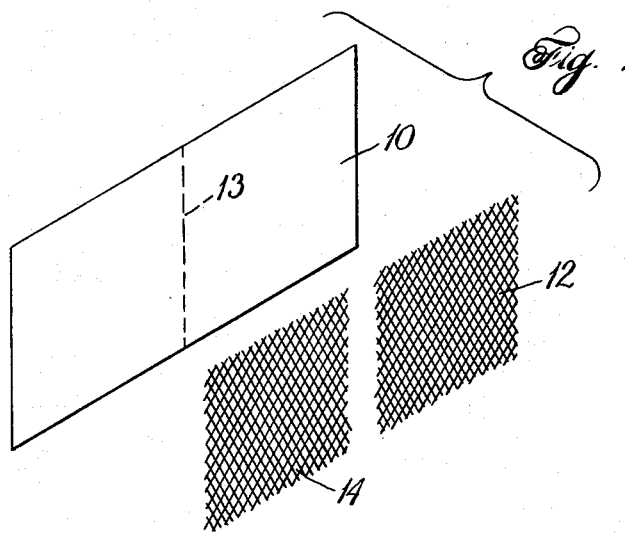
INVENTORS
GEORGE R. DRENGLER
MILTON B. CLARK
ROBERT E. STARK
THEODORE R. BEATTY
BY
ATTORNEY

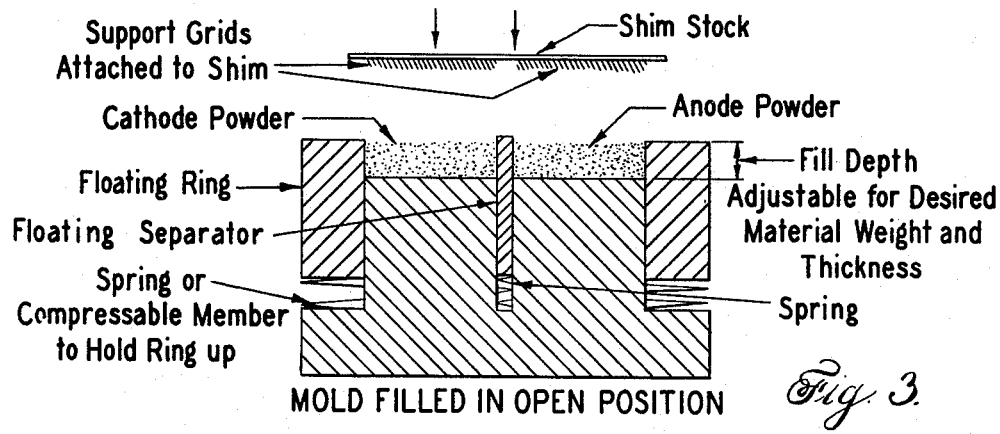
Fig. 3. MOLD FILLED IN OPEN POSITION
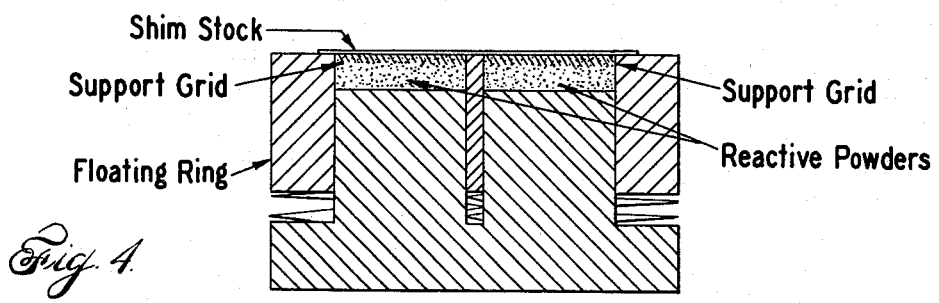
Fig. 4. SHIM STOCK-GRID MEMBERS POSITIONED IN MOLD
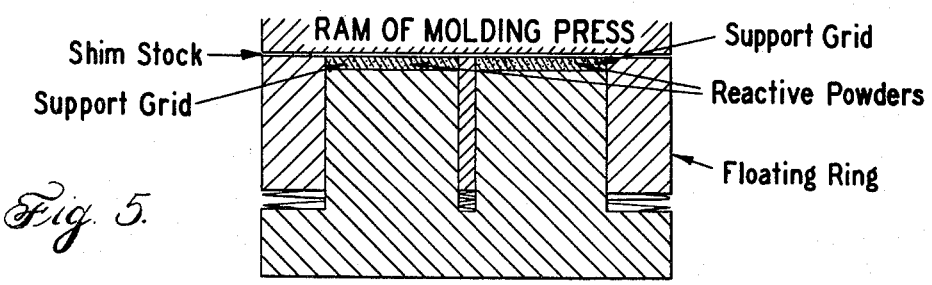
Fig. 5. ELECTRODE UNDER MOLDING PRESSURE
INVENTORS
GEORGE R. DRENGLER
MILTON B. CLARK
ROBERT E. STARK
THEODORE R. BEATTY

United States Patent Office 3,170,820
Patented Feb. 23, 1965

3,170,820
METHOD OF MAKING DUPLEX ELECTRODES
FOR HIGH RATE PRIMARY BATTERIES
George R. Drengler, North Olmsted, Milton B. Clark, North Royalton, and Robert E. Stark, Avon Lake, Ohio, and Theodore R. Beatty, Bennington, Vt., assignors to Union Carbide Corporation, a corporation of New York
Filed Mar. 19, 1963, Ser. No. 266,357
9 Claims. (Cl. 136—10)

This invention is concerned with high rate primary batteries, and more particularly to improved duplex electrodes therefor and to a method for producing same.

New applications demand efficient energy withdrawal from batteries in periods of one to ten minutes in contrast to conventional primary battery uses in which the life is measured in days, weeks, or months. Equally important, the weight and volume allotment given in these inventions to any component is held within restrictive limits. Thus, electro-chemical systems capable of delivering power at high rates are often unusable because of poor energy to weight or volume factors. Miniaturization of electronic gear utilized in these applications have made possible substantial increases in pay load. Still, the primary battery remains the only reliable power source for these applications. Therefore, a continuing effort toward improving the volumetric and gravimetric efficiency of high rate primary batteries is being made by battery manufacturers.

The construction practiced by high rate primary battery manufacturers is analogous to that seen in conventional storage batteries. The battery consists of a number of individual cell compartments contained in a one-piece plastic case. Positioned in each cell compartment are an appropriate number of anode and cathode plates together with electrode separators, the total of which is dependent upon desired current output. In the unit cell all anode plates are connected to a common lead wire, and similarly all cathode plates. Upon electrolyte addition, all the plates in one compartment are in a common solution reservoir. To provide desired battery voltage, these individual multi-plate cells are wired in series. This construction method necessitates each electrode to be affixed to a current collector of sufficient mass to conduct the current generated to the terminals without significant energy dissipation through heat ($I^2R$) losses. This collector is commonly a silver plated copper screen, 40 x 40 mesh—.014 inch thick, in applications where the electrode current density is 1.0–1.5 amperes per square inch (5–10 minute battery). The collector in this case represents 35 to 40 percent of the total electrode weight and volume. Thus the coulombic capacity per unit weight and volume of the electrodes is at best 60 percent of that obtainable were all the mass active material. This value is further reduced by the necessity of a multi-compartment case, which adds significant volume and weight to the packaged battery.

The silver oxide-zinc couple in potassium hydroxide electrolyte is presently the system most widely accepted for high rate primary batteries. Commercially the electrodes are electro-formed by multiple charging and discharging of porous silver plates (cathodes) and zinc oxide plates (anodes). This process is slow and costly.

Accordingly, it is therefore the main object of the present invention to provide a novel method of manufacturing economically, and in a minimum number of operations, duplex electrodes which are capable of permitting substantial reductions in the mass of structural members required for high rate primary batteries.

The object and other advantages of the invention will become more readily apparent from the following description, taken in conjunction with the accompanying drawings, wherein:

FIG. 1 is a series stack arangement of cells employing duplex electrodes made by the improved method of the invention;

FIG. 2 is an exploded view of a duplex electrode manufactured in accordance with the invention;

FIG. 3 is a cross-sectional view of a mold used in making the duplex electrode;

FIG. 4 is the same as FIG. 3, but shows the composite "shim stock"-grid members positioned on the mold; and FIG. 5 shows the duplex electrode in the mold under molding pressure.

The method of making duplex electrodes comprises compression molding electrochemically-active materials through lightweight, expanded metal grids, and against a face of a thin impervious electronically-conductive, electrochemically-inert cell separator member and then folding the separator member in half so that the grids are disposed opposite each other in a back-to-back fashion and separated by a double layer of separator material.

Essentially, and as shown on FIG. 2, the duplex electrode of the invention consists of a substantially rectangular electronically-conductive, electrochemically-inert cell separator member 10, for example, .001 inch to .003 inch thick steel "shim stock," preferably silver plated. Other thin metallic materials are also suitable in the practice of the invention provided they are inert with respect to the electrolytes and the reactive systems of the batteries. Lightweight expanded metal grids 12 and 14 serve to hold the active materials onto this shim. The grids can consist of 2/0, 13 mesh, .005 inch thick stock, expanded 1010 steel, also preferably silver plated.

More specifically, and in accordance with the present invention, the duplex electrodes as shown in FIGURES 1 and 2 are fabricated as follows:

A pair of grids composed of silver-plated expanded metal are spot welded to one face of a silver-plated shim stock. The shim stock is substantially longer than each of the grids and is rectangular in shape, and when divided in half, as for example, along the fold line 13, each half is slightly larger in area than the expanded metal grids (which are subsequently fastened to it) to prevent interelectrode communication. Then reactive materials are compressed either simultaneously or separately through and onto each grid and onto the portions of said face of the separator beneath said grids. Of course, if it is desired to compress the reactive materials simultaneously but at different pressures, a suitable press having dual rams must be used. In practice, it is preferred to compress each half of the duplex electrode using different pressures in order to control the desired activity of each electrode. It should be noted that the porosity and activity of the electrodes are effected by the pressures used to compact the reactive materials. For example, it is preferred when compressing the electropositive oxide material (cathodes), such as divalent silver oxide powder, to use pressures of from between about 5 to about 10 tons per square inch. On the other hand, it has been found suitable to compress the electronegative material (anodes) at a substantially lower pressure, i.e., of from between about 0.5 to about 1 ton per square inch.

The molding operations for the duplex electrode are more clearly illustrated sequentially in FIGS. 3 through 5. As shown on FIG. 3, anodic and cathodic powders are placed in separate cavities of a mold to a fill depth adjustable for desired material weight and thickness. Next, in FIG. 4, the shim-supported grids are placed over the powders, and in FIG. 5, the ram of the molding press is forced against the assembly. After the assembly is removed from the mold, the shim 10 is folded in half along the fold line 13, thereby forming a duplex electrode. If desired, the peripheral edges of the folded separator may suitably be secured together by soldering, spot or seam welding. The finished electrode thus consists of an anode face 12 (e.g. zinc) on one side thereof and a cathode face 14 (e.g., silver oxide or other oxide depolarizers) opposite thereto but on the same side thereof, all of which are supported by a common electronically conductive separator member (shim stock). The grids are visible through the active materials. Of course, it is readily apparent from the method of the invention that different pressures may be applied to each half of the electrode by using a pair of rams, each capable of compressing the powders with a desired load. This method is preferable where the porosity and density (desired activity) of each half of the duplex electrode are so different and incompatible with each other that they cannot be compressed simultaneously with the same ram (identical pressures).

To construct a 28 volt unit with silver oxide cathodes and zinc anodes, 18 or 19 of these parts can be stacked (with proper regard to polarity), one on top of the other with a suitably sorptive electrode separator 16 (nylon, or an unwoven fabric in which the fibers are bonded together by a regenerated cellulose, etc.) between active faces as shown in FIG. 2. The stack is inserted into a suitable container (not shown) for holding the electrodes in position and for retaining the electrolyte. The end electrodes in each stack have only one active face with the shim stock serving as a terminal connector and may be made separately or by merely cutting the duplex electrode shown in FIG. 2 in half along the fold line 13.

The grid member in this construction would weigh approximately .15 to .17 gm./in.$^2$, as compared to 0.50 to 0.55 gm./in.$^2$ in the previously discussed commercial battery. The duplex construction eliminates the need for a massive conductor, inasmuch as the current path is through the thickness of the stack, and not along the length of the electrodes. This means that in this construction the current path through one electrode is about .010 inch to .015 inch as compared to 1.5 to 2.0 inches in the commercial unit.

The gravimetric efficiency of the commercial high rate primary silver cell, exclusive of case and terminals, is 30 to 35 watt hours per pound. It should be noted that a six cell high rate primary silver cell constructed with the present duplex electrodes would provide about a weight efficiency of about 60 to 65 watt hours/pound (exclusive of case and terminals). Equally significant, the volumetric efficiency of such a construction would be nearly 2.5 times that of prior art commercial units (exclusive of case and terminals in each case).

It should be noted that unlike many previous duplex electrodes, those herein do not require the use of any organic or inorganic binders to achieve adherence of active particles to grid elements. Further prior art employment of grids has been limited to thick grids.

The duplex electrodes of the invention are particularly suitable for use in reserve-type batteries. In such batteries, a number of electrodes such as depicted on FIG. 1 and on FIG. 2 are positioned in suitable cell containers. Sufficient electrolyte to saturate the electrodes and the bibulous electrode separators is supplied when electricity is desired. It should be pointed out that the use of an amount of electrolyte greatly in excess of that required to saturate the cell elements, such as would occur were the stack to be immersed in electrolyte, would cause inter-cell shorting, and significantly reduce the electrical output. In actual practice the controlled required amount of electrolyte is poured, or otherwise directed, into the stack structure from one or more sides of the stack. The absorption capacity of the separators and electrodes readily removes any accumulation of electrolyte on the exterior of the stack, and thus prevents inter-cell shorting.

The chemically-active particles which may be used in the making of the present duplex electrodes include a large variety of electro-negative and electro-positive reactive materials. Such materials are employed in electrical couples consisting of a metal such as zinc, cadmium, magnesium, lead, iron or aluminum, and an oxide such as silver oxide, mercuric oxide, vanadium pentoxide, manganese dioxide, nickel oxide, copper oxide, etc. The amount thereof is commensurate with the thickness desired, and the required performance. For a duplex electrode measuring in its folded position 3 inches by 3.5 inches, the amount of active material on each half thereof can be suitably about 18 grams.

The present duplex electrodes can be employed in cells using a variety of electrolytes. Of these, potassium hydroxide solution containing from 31.5 to 33 percent KOH is preferred. Of course, it is obvious that the duplex electrodes of the invention can be made from single faced electrodes (such as those shown in FIG. 1 at each end of the battery stack) by suitably seam or spot welding back to back single face electrodes of opposite polarity along their peripheral edges.

It is to be understood that various modifications and changes may be made by those skilled in the art without departing from the spirit and scope of the invention.

This application is a continuation-in-part of our copending application, Serial Number 820,723, filed June 16, 1959, and entitled High Rate Primary Batteries, now United States Patent 3,087,003.

What is claimed is:

1. A method of fabricating duplex electrodes for use in primary batteries, comprising securing two thin expanded metallic grids to one face of a substantially rectangular shaped, electrically-conductive, electrochemically inert thin metallic separator, compressing an electropositive oxide material through and onto one of said grids and the portion of said face of said separator beneath said grid, compressing an electronegative material through and onto the other of said grids and the portion of said face of said separator beneath said grid, and folding said separator member in half such that said grids are disposed opposite each other in a back to back fashion.

2. The method of claim 1 wherein the peripheral edges of said folded separator are secured together.

3. The method of claim 1 wherein the compression of said electrochemically-reactive materials through and onto said grids and said face of said separator are carried on simultaneonsuly.

4. The method of claim 3 wherein the compression of said electropositive oxide material is done at a high pressure and the compression of said electronegative material is carried on at a lower pressure than that used for compressing said electropositive oxide material.

5. A method of fabricating duplex electrodes for use in high rate primary batteries, comprising securing two thin expanded metallic grids to one face of a substantially rectangular shaped, electronically-conductive, electrochemically inert thin metallic separator, compressing an electropositive oxide material selected from the group consisting of silver oxide, mercuric oxide, vanadium pentoxide, manganese dioxide, nickel oxide and copper oxide, through and onto one of said grids and the portion of said face of said separator beneath said grid, compressing an electronegative material selected from the group consisting of zinc, cadmium, magnesium, lead, iron and aluminum through and onto the other of said grids and the portion of said face of said separator beneath said grid, and folding said separator member in half such that said grids are disposed opposite each other in a back to back fashion.

6. The method as defined by claim 5 in which the peripheral edges of said folded separator are welded together.

7. The method as defined by claim 6 in which the peripheral edges of said folded separator are spot welded together.

8. The method of claim 5 wherein the compression of said electrochemically-reactive materials through and onto said grids and said face of said separator are carried on simultaneously.

9. The method of claim 5 wherein the compression of said electropositive oxide material is done at about 5 to about 10 tons per square inch and the compression of said electronegative material is carried on at about 0.5 to about 1 ton per square inch.

References Cited in the file of this patent
UNITED STATES PATENTS

| | | |
|---|---|---|
| 2,667,527 | Pucher | Jan. 26, 1954 |
| 2,715,652 | Chubb et al. | Aug. 16, 1955 |
| 2,999,122 | Zauner | Sept. 5, 1961 |